3,300,497
2-ARYL-2-PIPERAZINYLACETOPHENONES
Vsevolod Gruenman, Montclair, and Max Hoffer, Nutley,
N.J., assignors to Hoffmann-La Roche Inc., Nutley,
N.J., a corporation of New Jersey
No Drawing. Filed Aug. 19, 1964, Ser. No. 390,742
7 Claims. (Cl. 260—268)

This invention is concerned, in general, with new pharmacologically active compounds and with methods for their preparation. More particularly, the invention relates to novel 2-aryl-2-piperazinylacetophenones, to acid addition salts of these compounds, to novel intermediates useful in the preparation of said 2-aryl-2-piperazinylacetophenones and to processes for their preparation.

The novel 2-aryl-2-piperazinylacetophenone compounds of the invention in their free-base form can be represented by the general structure

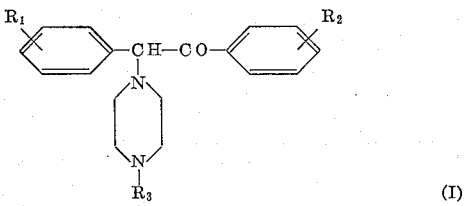

(I)

wherein $R_1$ and $R_2$ are each independently selected from the group consisting of hydrogen, halogen, lower alkyl and lower alkoxy; and $R_3$ is selected from the group consisting of hydrogen, acyl, hydroxy-lower alkyl and halogeno-lower alkyl.

The invention also embraces within its scope salts of the compounds of Formula I with medicinally acceptable acids.

As used throughout this specification, the term "halogen" comprehends the three halogens, namely, chlorine, bromine and iodine. The term "lower alkyl" comprehends both straight and branched chain saturated hydrocarbons having from 1 to 7 carbon atoms. The lower alkoxy groups include ether groups containing the same alkyl groups as above. The term "hydroxy lower-alkyl" comprehends any of the lower alkyls as defined above having a hydroxy group attached to one of the carbons of the hydrocarbon chain. The term "halogeno lower-alkyl" comprehends any of the lower alkyl groups as defined above having one or more halogen atoms attached to one or more of the carbons of the hydrocarbon chain. The term "acyl" represents an organic acid radical of the formula RCO- particularly those organic acid radicals in which R, in the foregoing formula, is a lower-aliphatic hydrocarbon having from 1 to 7 carbon atoms.

Those compounds corresponding to Formula I above wherein $R_1$ and $R_2$ are both in the para-position constitute a preferred group. An especially preferred group are the compounds corresponding to Formula I above wherein $R_1$ and $R_2$ are in the para-position and $R_3$ represents hydrogen or aliphatic acyl particularly lower-alkyl acyl. Representative compounds of this group are the 2-phenyl-2-piperazinylacetophenone, the 2-phenyl-2(4-formylpiperazinyl)acetophenone and acid salts thereof.

The free bases of this invention and their non-toxic acid addition salts are useful as psychostimulants of the non-MAO inhibitor type. They exhibit a stimulant action on the central nervous system. They are useful in the symptomatic treatment of mild depressive states and fatigue and, therefore, can be used effectively for the relief of disturbed or depressed states in psychotherapy. More particularly, these compounds provide a safe and efficient means of combatting induced central nervous system depression. They are especially useful in treating endogenous depressions without evoking other peripheral autonomic effects. The invention also provides novel chemical compounds which have blood-sugar lowering activity. For this purpose, the preferred embodiment of the invention is the free base and salts thereof with medicinally acceptable acids, corresponding to the Formula I structure in which $R_1$ is halogen or hydrogen, $R_2$ is hydrogen and $R_3$ is formyl. In addition, the free base, and acid addition salts thereof, corresponding to the Formula I structure in which $R_1$ and $R_3$ are hydrogen and $R_2$ is methoxy, have useful anti-edema properties. The free base, and acid addition salts thereof, corresponding to the Formula I structure wherein $R_1$ and $R_3$ are hydrogen and $R_2$ is methyl are useful as hypotensive agents.

The compounds of this invention can be administered enterally or parenterally, for example, they could be administered orally, intravenously or intraperitioneally. They can be administered in conventional pharmaceutical forms or in the form of pharmaceutical preparations which contain the compounds and their acid addition salts in admixture with pharmaceutical organic or inorganic solid or liquid carriers suitable for oral or parenteral administration, for example, water, gelatin, starch, magnesium stearate, talc, vegetable oils, gums, polyethylene glycols, vaseline and the like. The pharmaceutical preparations can be in conventional solid forms such as tablets, dragees, suppositories and the like or in conventional liquid forms such as solutions, suspensions, emulsions or the like. They can be submitted to conventional pharmaceutical expedients, for example, sterilization, etc.

The compounds may be administered in doses which are individualized for each patient. The actual administration in therapy depends essentially upon the condition of the individual patient and the desires of the practicing physician. Specific examples showing the embodiment of the present compounds in particular dosage forms will be found in the examples which follow hereinafter. The frequency of administration is variable depending upon the needs and requirements of the patient.

The compounds of this invention which are represented by Formula I above may be produced by initially condensing a halogen-desoxylbenzoine of the formula

(II)

in which the symbol X represents halogen and the symbol Ar stands for an aryl radical particularly a phenyl or substituted phenyl group and $Ar_1$ and $Ar_2$ may be the same or different aryl radicals with an N-monoacylpiperazine preferably in an inert organic solvent such as ethanol and in the presence of an acid-binding base thereby producing an intermediate represented by the following formula

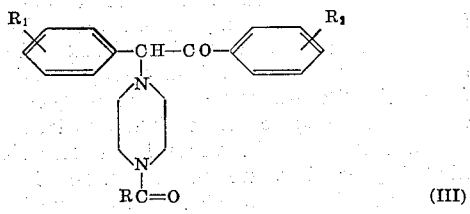

(III)

wherein $R_1$ and $R_2$ have the same meaning as in Formula I and R is an acylclic aliphatic hydrocarbon having 1 to 7 carbon atoms in the carbon chain.

The compound having the Formula III above is then hydrolyzed by heating with dilute acid solution to produce the compound of Formula I. The Formula III compound can be submitted to the hydrolysis step either in the crude form as obtained directly from the condensation step or it can be purified in the form of its free base or converted to its acid addition salt and purified.

The halogeno-desoxybenzoines used as starting materials in the practice of this invention are known compounds prepared by known methods. The preferred halogeno-desoxybenzoines are those in which the aryl radicals are phenyl or substituted phenyl radicals. Especially preferred are those halogeno-desoxybenzoines in which either or both of the aryl groups is a phenyl or phenyl substituted by a lower-alkyl, a lower-alkoxy or halogen in the para position such as, for example, p-tolyl, p-chlorophenyl and p-methoxyphenyl. Representative examples of halogeno-desoxybenzoines suitable for use in practicing this invention are: 2-bromo-2-phenylacetophenone, 2-bromo-4'-methoxy - 2 - phenylacetophenone, 2 - bromo-2-(p-chlorophenyl)-acetophenone, 2 - phenyl-2-bromo-p-methylacetophenone, 2-phenyl-2-bromo-4'-chloroacetophenone and bromodesoxyanisoin.

The condensation reaction is preferably carried out in an inert organic solvent though it can also be carried out in the absence of any solvent. As solvents, the lower aliphatic alcohols, especially ethanol, are particularly suitable, though other organic solvents such as toluene, benzene, chlorobenzene and the like can also be used. One could also use miscible mixtures of these organic solvents. The reaction is preferably carried out in the presence of an acid-binding base. Suitable acid-binding bases are the alkali metal carbonates, the alkali metal hydroxides or any of the tertiary organic bases such as triethylamine, pyridine, quinoline, etc. The condensation reaction is preferably carried out by heating the reaction mixture to above room temperature; however, room temperature or below can be used, if desired. A convenient temperature at which the reaction can be carried out is the reflux temperature of the reaction mixture.

The 2-phenyl-2-(4-acyl-1-piperazinyl)acetophenone produced in the condensation reaction can be readily hydrolyzed by a strong acid whereby the acyl function is split off leaving 2 - phenyl - 2 - piperazinylacetophenone. Any strong acid may be suitably used in the hydrolysis step. For example, one could use sulfuric acid or any of the hydrohalic acids, e.g., hydrobromic or hydrochloric. The acid is preferably used in aqueous solution. The temperature for the hydrolysis is not critical, though it has been found convenient to operate at elevated temperatures. The preferred temperature for carrying out the hydrolysis is a temperature near the boiling point of the strong acid that is used. Thus, for example, the preferred temperature when the hydrolysis is done with 20 percent hydrochloric acid which boils at about 120° is a temperature near 120°, more particularly, a temperature in the range of about 95° to about 120° C. When another strong acid is used, the preferred temperature range is appropriately selected in accordance with the boiling point of such acid.

In the selection of a piperazinyl compound for carrying out the condensation step, it has been found convenient to use an N-mono-substituted piperazine in order to avoid formation of the bis compounds, i.e., the bis-(2-oxo-1,2-diphenyl)piperazine. It has been found to be especially advantageous to use an N-mono-substituted piperazine from which the N-substituent can be easily split off by hydrolysis of the condensation product to form the unsubstituted compound of Formula I. Suitable N-mono-substituted piperazines are the N-mono-acyl piperazines, particularly those in which the acyl group is an acyclic aliphatic acyl radical having 1 to 7 carbon atoms such as formyl, acetyl, propionyl, etc. N-mono-formylpiperazinyl has been found to be an especially suitable compound for use in this aspect of the invention since the resulting 2-phenyl-2-(4-formyl-1-piperazine)acetophenone is readily hydrolyzed to 2-phenyl-2-piperazinylacetophenone. The 2-phenyl-2-piperazinylacetophenone product can, if desired, be further reacted by known techniques to produce the compounds of Formula I wherein $R_3$ is other than hydrogen as will be more fully discussed hereinafter.

While the foregoing process constitutes an advantageous method of producing the compounds of Formula I, it is also possible to utilize in the condensation reaction an N-mono-substituted piperazine having a substituent radical such as an alkyl group which cannot be easily split off after condensation with an halogen-desoxybenzoine. In such case, the resulting product will have a substituent radical in the 4-position of the piperazine moiety. The substituent in the $N_4$-position of the product will, in each case, be determined by selection of an appropriate N-mono-substituted piperazine. Thus, in the case where the condensation reaction is carried out with an N-(lower)alkylpiperazine, the condensation product will have a lower alkyl radical in the 4-position of the piperazine moiety. In any event, the condensation reaction described above can be easily carried out when one of the nitrogens of the piperazine compound used in the reaction is protected by a substituent group. In such case the N-substituent of the N-mono-substituted piperazine protects one nitrogen leaving only one NH group available to react with the halogeno-desoxybenzoine thereby avoiding the formation of the bis compound, i.e., 1,4-bis-(2-oxo-1,2-diarylethyl)piperazine. In this reaction, the N-mono-substituted piperazine condenses with the halogeno-desoxybenzoine in approximately mole to mole ratio.

The products of the invention can also be produced by reacting halogeno-desoxybenzoine with unsubstituted piperazine in a weakly acidic solution. Whereas halogeno-desoxybenzoine ordinarily reacts with piperazine predominantly at a ratio of 2 moles to 1 mole with substitution on both NH groups to give 1,4-bis-(-2-oxo-1,2-deoxyethyl)piperazines, it has now been found, surprisingly, that in weak acidic solution and under heat, the reaction proceeds predominantly on a mole to mole ratio with substitution occurring at only one of the NH groups of the piperazines. Any weak acid may be used in this reaction though it has been found convenient to use a lower aliphatic carbonic acid such as acetic acid or propionic acid. The temperature of the reaction is not critical though it has been found convenient to operate at elevated temperatures. A preferred temperature range is 80 to 150°. An especially suited temperature is the reflux temperature of the reaction mixture. Upon completion of the reaction, the reaction mixture is made alkaline with aqueous ammonia or any other suitable alkaline reagent such as alkali metal hydroxide or alkali metal carbonate. The alkalization converts the product into the free-base from which it is then separated and purified in the usual manner.

In still another alternative process, the novel compounds of Formula I can be prepared by reacting a halogeno-desoxybenzoine with diethanolamine to form a 2-aryl-2-bis(2-hydroxyethyl)aminoacetophenone which can be represented by the following structural formula

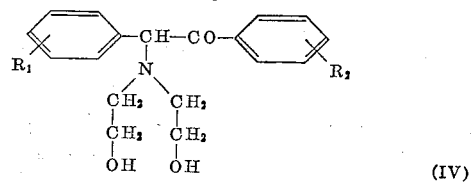

(IV)

wherein $R_1$ and $R_2$ have the same significance as the corresponding symbols in Formula I.

The hydroxyl groups of the 2-aryl-2-bis(2-hydroxyethyl) aminoacetophenone can then be substituted by halogen and the resulting 2-aryl-2-bis(2-halogenoethyl)-aminoacetophenone reacted with ammonia or a primary amine to give the corresponding compound of Formula I.

As in the case of the Formula I compounds, those compounds of Formula IV above wherein $R_1$ and $R_2$ are in para position constitute a preferred group.

The intermediates represented by Formula IV above, as well as the halogen derivatives thereof, are also novel compounds and thus constitute a part of this invention. In addition to being useful as intermediates in the preparation of the novel piperazinylacetophenones, the compounds of Formula IV, their halogen derivatives and the pharmaceutically acceptable acid addition salts, in each case, are useful also as anti-convulsants.

The compounds of Formula IV are prepared by condensing diethanolamine with an appropriate halogenodesoxybenzoine which can be easily done by simply adding the halogenodesoxybenzoine to a mixture of diethanolamine and water with stirring. The reaction temperature is not critical and can be varied over a wide range of temperatures. It has, however, been found suitable to operate at an elevated temperature. Preferably, the mixture is heated to a temperature within the range of from 90 to 100°. Upon completion of the reaction, the reaction mixture is cooled whereupon the product is crystallized as the free base and recovered in the usual manner. The hydrochloride salts of these compounds are prepared by adding the free base to an aqueous solution of hydrochloric acid and heating with stirring. The salt can be separated and washed with organic solvents such as acetone. The hydrochloride salt of 2-phenyl-2-bis(2-hydroxyethyl)aminoacetophenone prepared in this way is converted to the corresponding 2-phenyl-2-bis(2-chloroethyl)aminoacetophenone salt by replacing the hydroxyl groups with halogen. The substitution can be accomplished by the application of known techniques for forming alkyl halides from alcohols such as reaction with halogen acids, phosphorus halides or thionyl chloride. In a preferred embodiment of the instant invention, chlorine is substituted in place of the hydroxyl groups of the 2-phenyl-2-bis(2-hydroxyethyl)aminoacetophenone by reacting with thionyl chloride in the presence of a catalyst. The reaction is conveniently carried out in an inert organic solvent such as, for example, chloroform in the presence of a suitable catalyst such as dimethylformamide. The reaction is preferably carried out at an elevated temperature. An especially suitable temperature is the reflux temperature of the reaction mixture. Upon completion of the reaction, the product is recovered by extraction with water. The 2-aryl-2-bis(2-chloroethyl)aminoacetophenone products obtained in this way are suitable intermediates for conversion to the 2-phenyl-2-piperazinyl-acetophenone end product of this invention. The 2-aryl-2-bis(2-chloroethyl)aminoacetophenones can be converted to the corresponding 2-phenyl-2-piperazinylacetophenones by autoclaving with ammonia or a primary amine such as alkylamine or hydroxylamine. The reaction is conveniently carried out in the presence of an organic solvent such as alcohol at an elevated temperature preferably in the range of about 130° to about 150°. After completion of the reaction, the product is recovered by extracting with an organic solvent such as benzene and working up in the usual manner. The product can be crystallized as its hydrochloride salt by adding alcoholic hydrogen chloride and recovering the precipitate in the usual manner. Methods of working up and recovering the product will be readily apparent to those skilled in the art and are set forth in detail in the examples which follow.

Finally, substituents $R_3$ can be introduced into the 4-position of the 2-phenyl-2-piperazinylacetophenone prepared by any of the foregoing procedures. Such substitutions are accomplished by submitting the 2-phenyl-2-piperazinylacetophenone to known substitution reactions. Thus, the hydrogen in the 4-position of the piperazine moiety can be replaced with an alkyl group by reacting with an alkylating agent the compounds of Formula I wherein $R_3$ is hydrogen. Among the alkylating agents which can be used are alkyl halides, alkyl benzenesulfonates, dialkylsulfates and the like. In those cases where an alkyl substituent having two or more carbon atoms is desired, a particularly suitable alkylation technique is the Eschweiler reaction which utilizes an alkylating agent consisting of a mixture of formaldehyde and an organic acid. A preferred alkylating agent is a mixture of formaldehyde and formic acid which acts as a methylating agent. The alkyl substituent can be further substituted by a hydroxy group thereby producing a compound having a hydroxy alkyl as its $R_3$ substituent. The hydroxy substitution can be conveniently effected by reacting the alkyl substituted compound with ethylene oxide or chloroethanol. The hydroxy group of the hydroxyalkyl substituent can, in turn, be replaced by a halogen using known halogenation techniques.

The products of this invention, represented by Formula I above, as well as the intermediates represented by Formula IV, form acid addition salts with various inorganic and organic solvents. Such salts are also within the scope of this invention. Illustrative acid addition salts include the hydrohalides, e.g., hydrochloride, hydrobromide, hydroiodide, other mineral acid salts, e.g., sulphate, phosphate, nitrate and other acid salts such as tartrate, citrate, salicylate, malate, etc. The hydrohalides and, in particular, the hydrochloride, are preferred. The acid addition salts are prepared by reacting the base with the appropriate acid, preferably in an inert solvent with an excess of the acid present and recovering the product by conventional means from the reaction mixture.

The following examples are illustrative of the invention. All temperatures are in degrees centigrade and all melting points are corrected.

EXAMPLE 1

Examples 1 and 2 illustrate the method of preparing the 2-phenyl-2-(4-acyl-1-piperazinyl)acetophenone hydrochloride intermediate by the condensation of a halogenodesoxybenzoine with a N-monoacylpiperazine.

83 grams (0.3 mole) of 2-bromo-2-phenylacetophenone, 60 ml. of ethanol, 30 g. of triethylamine and 33 g. of N-formylpiperazine were mixed and heated under reflux on a steam bath for 2 hours. The reaction mixture was poured into 250 ml. of cold water. The product precipitated as an oil which solidified slowly in the course of 24 to 48 hours, or more rapidly, upon seeding. It was filtered by suction, crushed on the filter and washed with water. The 2-(4-formyl-1-piperazinyl)acetophenone obtained in this way melted at 100°. A pure sample of the free base, upon recrystallization from methanol-water, melted at 106–108°.

The hydrochloride salt was precipitated from the alcoholic solution of the base with alcoholic hydrogen chloride. It was recrystallized twice from alcohol and dried through boiling with xylene. The melting point of the recrystallized salt was 231–233°.

EXAMPLE 2

16.5 grams of N-acetylpiperazine hydrochloride (0.1 mole), 27.5 g. of 2-bromo-2-phenylacetophenone (0.1 mole) and 13.8 g. of potassium carbonate (0.1 mole) were boiled under reflux in xylene (100 ml.) for 4 hours. Upon cooling, the inorganic salts were filtered off by suction, the filtrate washed with a little water and the base precipitated with anhydrous hydrochloric acid as an amorphous hydrochloride. The crude 2-phenyl-2-(4-acetyl-1-piperazinyl)acetophenone hydrochloride was heated in 20 ml. of 20 percent aqueous hydrochloric acid under reflux at 95–100° for 5 hours. Upon cooling, the reaction mixture was made alkaline with 3 N sodium hydroxide solution and the free base extracted with 75 ml. of benzene. The base was then precipitated from the benzene with anhydrous hydrochloric acid and the resulting yellow colored amorphous hydrochloride collected on the filter with suction. Upon treatment with warm ethanol, the crystalline 2-phenyl-2-(4 - acetyl-1-piperazinyl)acetophenone dihydrochloride having a melting point of 105° was obtained.

EXAMPLE 3

This example illustrates the hydrolysis of the condensation product whereby 2-phenyl-2-piperazinylacetophenone is obtained as the dihydrochloride monohydrate.

494 g. (1.6 mole) of 2-phenyl-2-(4-formyl-1-piperazinyl)acetophenone, crude base, as obtained in Example 1, was dissolved in 1000 ml. of 20 percent aqueous hydrochloric acid and the solution heated for 4 hours on a steam bath under reflux. After allowing to cool, the solution was separated from a slight amount of an insoluble impurity (benzoin, 15 g.) by filtration and evaporated in a vacuum to a thick syrup. Crystallization was initiated by heating the residue with 500 ml. of alcohol and allowing to cool. The crystals were filtered by suction, recrystallized from 2800 ml. of 98 percent alcohol and dried at 45° to constant weight. The melting point of the crystalline 2-phenyl-2-piperazinylacetophenone dihydrochloride monohydrate product was 195–197°.

The following Examples 4 through 10 illustrate the novel compounds of this invention wherein the substituents $R_1$ and $R_2$ of structural Formula I are other than hydrogen.

EXAMPLE 4

*4'-methoxy-2-(4-formyl-1-piperazinyl)-2-phenylacetophenone hydrochloride*

17 g. of formylpiperazine, 18 g. of triethylamine and 46 g. of 2-bromo-4'-methoxy-2-phenylacetophenone were reacted in analogy to Example 1. After pouring the reaction mixture into 200 ml. of water, the precipitated oil was extracted with benzene, the benzene layer was washed repeatedly with water and dried. Anhydrous hydrogen chloride was conducted into the benzene solution as long as the amorphous hydrochloride of the product precipitated. The supernatant solvent was decanted and the precipitate heated with 150 ml. of isopropanol on the steam bath until it had become completely crystalline. After allowing to cool, the material was collected by filtration and recrystallized from methanol-ether. The product so obtained melted at 226–227°. The free base obtained from the aqueous solution of the hydrochloride by precipitation with ammonia and recrystallization from isopropanol, melted at 115–116°.

EXAMPLE 5

*4'-methoxy-2-phenyl-2-(1-piperazinyl)acetophenone dihydrochloride*

26 g. of 4'-methoxy-2-(4-formyl-1-piperazinyl)-2-phenyl-acetophenone hydrochloride were heated with 20 percent aqueous hydrochloric acid (60 ml.) for 4 hours under reflux on a steam bath. The solution was diluted with 100 ml. of water and made alkaline with ammonia. The precipitated oil was extracted with benzene and the hydrochloride precipitated by conducting anhydrous hydrogen chloride into the dried benzene layer. The hydrochloride recrystallized from water-acetone melted at 210°. The free base melted at 86°.

EXAMPLE 6

*2-(p-chlorophenyl)-2-(4-formyl-1-piperazinyl)acetophenone hydrobromide*

62 g. of 2-bromo-2-(p-chlorophenyl)acetophenone, 22.8 g. of formylpiperazine and 22 g. of triethylamine were heated on a steam bath under reflux for 3 hours. After pouring the reaction mixture into 500 ml. of water, the product was precipitated as a soon crystallizing oil. Recrystallized from carbon tetrachloride, it melted at 117–118°.

The hydrobromide was obtained by precipitating an acetone solution of the base by the careful addition of a 48 percent aqueous hydrobromic acid. Recrystallized from ethanol, it melted at 235°.

EXAMPLE 7

*2-phenyl-2-(4-formyl-1-piperazinyl)-4-methylacetophenone hydrochloride*

58 g. of 2-phenyl-2-bromo-p-methylacetophenone, 22.8 g. of monoformylpiperazine, 20 g. of triethylamine and 50 ml. of ethanol were refluxed for 3 hours on a steam bath. After working up as in Example 4, the hydrochloride of the product was obtained melting at 233°.

EXAMPLE 8

*4'-methyl-2-phenyl-2-(1-piperazinyl)acetophenone dihydrochloride monohydrate*

The crude oily base of 2-phenyl-2-(4-formyl-1-piperazinyl)-4'-methylacetophenone as obtained from 58 g. of 2-phenyl-2-bromo-p-methylacetophenone in Example 7, was heated with 130 ml. of 20 percent aqueous hydrochloric acid on a steam bath under reflux for 3 hours. After diluting with water and neutralizing with ammonia, the product was precipitated as an oil. The hydrochloride was obtained by precipitating the ethereal solution of the base with anhydrous hydrogen chloride and recrystalizing the precipitate from water-acetone. The compound loses its water of crystallization at about 130° and melts water free at 199–200°.

EXAMPLE 9

*4'-chloro-2-(4-formyl-1-piperazinyl)-2-phenylacetophenone hydrochloride*

45 g. of 2-phenyl-2-bromo-4'-chloroacetophenone, 18 g. of triethylamine and 17 g. of formylpiperazine were heated for 4 hours. After pouring the reaction mixture into water and slurrying the precipitated oil with a little ether, the base crystallized. After recrystallization from alcohol, it melted at 142–143°. The hydrochloride, when crystallized from alcohol-ether, melted at 229–230°.

EXAMPLE 10

*4'-chloro-2-phenyl-2-(1-piperazinyl)acetophenone dihydrochloride*

24 g. of 4-chloro-2-(4-formyl-1-piperazinyl)-2-phenyl-acetophenone and 50 ml. of 20 percent aqueous hydrochloric acid were heated on a steam bath for 3 hours. The reaction mixture was worked up as in Example 5 to give the dihydrochloride of 4'-chloro-2-phenyl-2-(1-piperazinyl)acetophenone melting at 205°.

The following Examples 11 through 16 are representative of the novel compounds of this invention in which the substituent $R_3$ of structural Formula I is other than hydrogen.

EXAMPLE 11

*2-(p-chlorophenyl)-2-(4-methyl-1-piperazinyl)acetophenone dihydrochloride*

42 g. of 2-(p-chlorophenyl)-2-(4-formyl-1-piperazinyl)acetophenone were heated with 100 ml. of 20 percent hydrochloric acid on the steam bath for 3 hours. 50 ml. of formic acid and 30 ml. of 30 percent aqueous formaldehyde solution were added to the reaction mixture and heating continued for 2 hours. The mixture was diluted with 200 ml. of water and the base of the reaction product was precipitated by the addition of aqueous ammonia. It was extracted with ether, the ether layer dried and the hydrochloride precipitated by conducting anhydrous hydrogen chloride into the ethereal solution. Recrystallized from methanol, the product formed white crystals melting at 252°.

An identical product was obtained from 2-bromo-2-(p-chlorophenyl)acetophenone (1 mole) and 1-methyl-piperazine (2 moles) in alcohol at 70–80°.

EXAMPLE 12

*2-phenyl-2-(4-methyl-1-piperazinyl)acetophenone dihydrochloride*

285 g. of 2-phenyl-2-bromoacetophenone was added in small portions to 235 g. of N-methylpiperazine. The temperature rose spontaneously to 60–75° and was kept there after termination of the spontaneous reaction for an additional 2½ hours. After pouring the reaction mixture in 1 liter of water, the oily base was extracted with 600 ml. of benzene, the benzene layer was washed repeatedly with water and the hydrochloride of the reaction product precipitated with anhydrous hydrogen chloride. After recrystallization from 1200 ml. of isopropanol, the product melted at 252–254°.

EXAMPLE 13

*2-(4-methoxyphenyl)-2-(4-methyl-1-piperazinyl)-4'-methoxypiperazine dihydrochloride*

63 g. of bromodesoxyanisoin and 57 g. of N-methylpiperazine gave in analogy to Example 12 the dihydrochloride of 2-(4-methoxyphenyl)-2-(4-methyl-1-piperazinyl)-4'-methoxypiperazine have a melting point of 232–233°.

EXAMPLE 14

*2-phenyl-2-(4-methyl-1-piperazinyl)-4'-methylacetophenone dihydrochloride*

The compound was obtained by refluxing 58 g. of 2-phenyl-2-bromo-p-methylacetophenone, 20 g. of N-methylpiperazine, 20 g. of triethylamine and 50 ml. of alcohol for 3 hours. The hydrochloride was obtained in analogy to Example 12. Recrystallized from dil. hydrochloric acid, it melted at 265–266°.

EXAMPLE 15

*2-phenyl-2-(4-hydroxyethyl-1-piperazinyl)acetophenone dihydrochloride*

47 g. of 2-phenyl-2-piperazinylacetophenone (free base of Example 3) were dissolved in 150 ml. of alcohol and, under cooling with running water, 15 g. of ethylene oxide was conducted into the solution. After allowing to stand at 20–35° for 3 days, the solvent was evaporated in vacuo, the residue was dissolved in a mixture of ethyl acetate and benzene, and the hydrochloride of the product precipitated with anhydrous hydrochloric acid. After recrystallization from methanol-ether, the product was obtained with melting point of 254–256°.

EXAMPLE 16

*2-phenyl-2-[4-(2-chloroethyl)-1-piperazinyl] acetophenone dihydrochloride*

20 g. of 2-phenyl-2-(4-hydroxyethyl-1-piperazinyl)acetophenone dihydrochloride were suspended in 120 ml. of chloroform. 0.5 ml. of dimethylformamide and 16 g. of thionylchloride were added and the mixture refluxed for 4 hours. After allowing to stand overnight, the solid was filtered by suction, washed on the filter with chloroform, slurried with ethanol and filtered again. Recrystallized from water as a hydrate, the product forms white crystals melting at 189–196°.

Examples 17 and 18 below illustrate the alternative process for producing the novel compounds of this invention in which an unsubstituted piperazine is reacted with halogeno-desoxybenzoine in weakly acidic solution.

EXAMPLE 17

*2-phenyl-2-piperazinylacetophenone dihydrochloride monohydrate*

10 g. of piperazine (anhydrous) were carefully added to 40 ml. of acetic acid and after the spontaneous rise of temperature (due to formation of the acetate) had subsided, 27.5 g. of 2-bromo-2-phenylacetophenone were added. The reaction mixture was refluxed for 10 minutes, the excess acetic acid was distilled off and the residue poured into 200 ml. of water. The solution was made alkaline with ammonia and the precipitated oil extracted with benzene. The benzene layer was washed with water and the hydrochloride of the product was precipitated with anhydrous hydrochloric acid. The hydrochloride of the product obtained in this way proved to be identical with the product of Example 3.

EXAMPLE 18

8.6 grams of piperazine were dissolved in 20 ml. of propionic acid and the mixture heated to 100–110°. 13.35 grams of bromodesoxybenzoine were added in small portions at 120–130° and the reaction mixture kept at this temperature for 20 minutes. The reaction mixture was then poured into 150 ml. of 3 N sodium hydroxide solution and the precipitated oil extracted twice with 100 ml. of benzene. The benzene layer was washed with water and finally the hydrochloride of 2-phenyl-2-piperazinylactophenone was precipitated by conducting anhydrous hydrogen chloride into the extract. The recrystallized material was identical with the product.

Example 19 illustrates the preparation of the intermediates of structural Formula IV.

EXAMPLE 19

*2-phenyl-2-bis(2-hydroxyethyl)aminoacetophenone*

To a mixture of 218 g. of diethanolamine and 100 ml. of water there were added under stirring and in portions 285 g. of 2-bromo-2-phenylacetophenone. The mixture was heated to 90–100° for 30 min. Upon cooling, the product crystallized and was collected by filtration by suction. To prepare the hydrochloride, the base was suspended under stirring and heating to 80–100° in 400 ml. of 3 N aqueous hydrochloric acid, the hydrochloride filtered after chilling and washed with acetone on the filter. Recrystallized from water, the compound melted at 193°.

In like manner, there were prepared:

4'-chloro-2-phenyl-2-[bis(2-hydroxyethyl)amino]acetophenone hydrochloride, M.P. 196°, free base M.P. 166°;

4'-methyl-2-phenyl-2-[bis(2-hydroxyethyl)amino]acetophenone hydrochloride, M.P. 188°, free base M.P. 155°; and 4'-methoxy-2-phenyl-2-[bis(2-hydroxyethyl)amino]acetophenone hydrochloride, M.P. 165–166°, free base M.P. 119–120°.

Example 20 illustrates the conversion of a 2-phenyl-2-bis(2-hydroxyethyl)aminoacetophenone of Formula IV to the corresponding halo-substituted compound.

EXAMPLE 20

*2-phenyl-2-bis(2-chloroethyl)aminoacetophenone*

64 g. of 2-phenyl-2-bis(2-hydroxyethyl)aminoacetophenone hydrochloride were suspended in 90 ml. of chloroform, 1 ml. of dimethylformamide was added as a catalyst and 56 g. of thionylchloride dropped into the stirred suspension. After the addition of the thionylchloride, the reaction mixture was still refluxed on a steam bath for 20 min. The reaction mixture was poured into 200 ml. of water and made slightly alkaline by the addition of aqueous ammonia. The chloroform layer was separated, washed with water and the solvent evaporated in a vacuum. The residue was dissolved in a minimum amount of warm alcohol and allowed to crystallize after chilling. The product melted at 53–54°.

Example 21 illustrates the method by which the 2-phenyl-2-piperazinylacetophenone end products are prepared from the 2-phenyl-2-bis(2-chloroethyl)aminoacetophenone intermediates.

EXAMPLE 21

*2-phenyl-2-piperazinylacetophenone dihydrochloride monohydrate*

20 g. of 2-phenyl-2-bis(2-chloroethyl)aminoacetophenone were autoclaved with 300 ml. of 4 percent alcoholic ammonia for 5 hrs. at 130–150°. The solution was evaporated in vacuo, the residue extracted with benzene, the benzene layer washed with water and the hydrochloride of the product precipitated by the addition of alcoholic hydrogen chloride. After recrystallization from alcohol or aqueous 3 N hydrochloric acid, the hydrochloride was obtained, being identical with the product of Example 3.

EXAMPLE 22

This example is included herein to demonstrate the preparation of dosage forms of a compound representative of the compounds of this invention.

2-PHENYL-2-PIPERAZINYLACETOPHENONE DIHYDROCHLORIDE MONOHYDRATE

Parenteral formulation:  Dry fill ampul 5 cc.
2-phenyl-2-piperazinylacetophenone
  dihydrochloride monohydrate, mg. _____ 100

(A parenteral grade of the drug, fiber free, is filled into the ampul using a Diehl Mater electric filler or other suitable type filler. The ampuls are sealed and sterilized at 255° F. for 2 hours.)

Immediately before use the powder is solubilized with the following solution:

Water for injection, U.S.P., cc. _____ 5

Suspension granulation:  Per 100 mg. dose
2-phenyl-2-piperazinylacetophenone
  dihydrochloride monohydrate, mg. _____ 100.0
Sugar powdered, mg. _____ 2,610.0
Sodium saccharin, mg. _____ 2.5
Sodium sucaryl, mg. _____ 37.5
Isopropyl alcohol 85 percent, cc., approx. __ 300

Dry weight, mg. _____ 2,750

Procedure:
(1) Place the drug and the other dry ingredients in a suitable size mixer and mix well.
(2) Pass the mixture through a Fitzpatrick Comminuting Machine fitted with a No. 2 screen to break up the lumps.
(3) Return the mixed powders to the mixer and granulate with the 85 percent isopropyl alcohol.
(4) Pass the wet granulation through a Fitzpatrick Comminuting Machine fitted with a No. 5 screen. Spread the moist granules on paper lined trays and dry overnight at 115° F. until the moisture content is 0.5 percent or less.
(5) Pass the dry granulation through a No. 16 mesh screen.
(6) Each 2.75 gm. of powder as prepared above contains 100 mg. of drug. This powder may now be filled into suitable size bottles containing an amount of the prepared granulation in any desired multiple of 2.75 gms. and having sufficient head space to allow the addition of water to give a final suspension containing 100 mg. of drug per 5 ml. of suspension. For example, 27.5 gms. of powder may be filled into a screw cap amber bottle with sufficient head space to allow the addition of water to bring the finished suspension up to 50 ml. The resultant suspension will contain 100 mg. of drug per 5 ml. of suspension.

Tablet formulation:  Per tablet, mg.
2-phenyl-2-piperazinylacetophenone
  dihydrochloride monohydrate _____ 25.0
Lactose, spray dried _____ 72.0

Tablet formulation—continued  Per tablet, mg.
Corn starch, U.S.P. _____ 2.0
Calcium stearate _____ 1.0

Total weight _____ 100.0

Procedure:
(1) Blend the drug and the lactose, corn starch, and calcium stearate in a suitable mixer.
(2) Compress the powder on a heavy duty tablet compressing machine to yield tablet slugs of about 1″ diameter and ¼″ thickness.
(3) Pass the tablet slugs through a suitable comminuting machine to yield granules of approximately 16 mesh with a minimum of fines.
(4) Recompress the granulation on a tablet compressing machine using a ¼″ standard concave punch to an average tablet weight of 100 mg.

Suppository formulation:  Per 1.3 gm. suppository, gm.
2-phenyl-2-piperazinylacetophenone
  dihydrochloride monohydrate _____ 0.025
Wecobee M [1] _____ 1.225
Carnauba wax _____ 0.050

[1] F. F. Drew Company, 15 E. 26th St., New York 10, N.Y.

Procedure:
(1) Melt the carnauba wax and the Wecobee M in a suitable glass or stainless steel container and cool the mixture to approximately 45°.
(2) Add the drug and stir thoroughly until completely dissolved and dispersed.
(3) Pour the material into suppository molds to form suppositories having a weight of 1.3 gm. each.
(4) The suppositories may be individually wrapped in foil or wax paper for packaging.

Capsule formulation:  Per capsule, mg.
2 - phenyl - 2 - piperazinylacetophenone dihydrochloride monohydrate _____ 50
Lactose, U.S.P. _____ 125
Corn starch, U.S.P. _____ 30
Talc, U.S.P. _____ 5

Total net weight _____ 210

Procedure:
(1) Mix the drug with lactose and corn starch in a suitable mixer.
(2) Further blend the mixture by passing through a Fitzpatrick Comminuting Machine with a No. 1A screen with knives forward.
(3) Return the blended powder to the mixer, add the talc and blend thoroughly.
(4) Fill into No. 4 hard shell gelatin capsules on a Parke Davis or similar type capsulating machine.

We claim:
1. A member selected from the group consisting of compounds of the formula

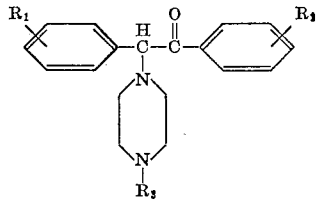

wherein $R_1$ and $R_2$ each represent a member independently selected from the group consisting of hydrogen, halogen, lower alkyl and lower alkoxy; and $R_3$ represents a member selected from the group consisting of formyl and lower alkanoyl and pharmaceutically acceptable acid addition salts thereof.

2. 2-phenyl-2-(4-formyl-1-piperazinyl)acetophenone.
3. 2-(p-chlorophenyl)-2-(4 - formyl - 1 - piperazinyl) acetophenone.

4. 2-phenyl-2-(4-acetyl-1-piperazinyl)actophenone.
5. 4'-methoxy-2-(4-formyl-1-piperazinyl) - 2 - phenylacetophenone.
6. 2-phenyl-2-(4-formyl-1 - piperazinyl) - 4 - methylacetophenone.
7. 4'-chloro-2-(4-formyl-1 - piperazinyl) - 2 - acetophenone.

References Cited by the Examiner
UNITED STATES PATENTS

| | | | |
|---|---|---|---|
| 2,636,032 | 4/1953 | Weston et al. | 260—268 |
| 2,911,407 | 11/1959 | Langdon et al. | 260—268 |
| 2,927,924 | 3/1960 | Mills | 260—268 |
| 3,180,867 | 4/1965 | Shapiro et al. | 260—268 |

FOREIGN PATENTS

| | | |
|---|---|---|
| 846,795 | 8/1960 | Great Britain. |
| 1,313,095 | 11/1962 | France. |
| 368,193 | 5/1963 | Switzerland. |

OTHER REFERENCES

Albro et al.: Journal Organic Chemistry, vol. 14, pages 771–774, 1949.

Lespagnol et al.: Chemical Abstracts, vol. 59, pages 8743–8745, October 1963 [abstract of Cong. Sci. Pharm., Conf. Comm., vol. 21, Pisa, 1961, pages 670–680, 1962].

ALEX MAZEL, *Primary Examiner.*

J. W. ADAMS, *Assistant Examiner.*